United States Patent
Izumi

(10) Patent No.: US 7,921,168 B2
(45) Date of Patent: Apr. 5, 2011

(54) CHAT SYSTEM, CHAT DEVICE, CHAT SERVER CONTROL METHOD, AND INFORMATION STORAGE MEDIUM INCLUDING CHAT STOP LIMITING CAPABILITY BASED ON KEYWORD

(75) Inventor: Tadakatsu Izumi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 188 days.

(21) Appl. No.: 12/159,910

(22) PCT Filed: Dec. 15, 2006

(86) PCT No.: PCT/JP2006/325103
§ 371 (c)(1),
(2), (4) Date: Jul. 2, 2008

(87) PCT Pub. No.: WO2007/077721
PCT Pub. Date: Jul. 12, 2007

(65) Prior Publication Data
US 2009/0182826 A1   Jul. 16, 2009

(30) Foreign Application Priority Data
Jan. 6, 2006 (JP) ................................. 2006-001545

(51) Int. Cl.
*G06F 15/16* (2006.01)
(52) U.S. Cl. ........ 709/206; 709/201; 709/203; 709/204; 709/207
(58) Field of Classification Search .................. 709/201, 709/203, 206, 204, 207
See application file for complete search history.

(56) References Cited

U.S. PATENT DOCUMENTS

| | | | |
|---|---|---|---|
| 6,799,199 B1 * | 9/2004 | Segal et al. | ................... 709/207 |
| 2002/0083179 A1 | 6/2002 | Shaw et al. | |
| 2002/0156854 A1 | 10/2002 | Matsumoto | |

(Continued)

FOREIGN PATENT DOCUMENTS

JP  2001-195319 A  7/2001

(Continued)

OTHER PUBLICATIONS

"Final Fantasy XI Girato no Gen'ei Playing Manual" Square ENIX, Mar. 31, 2005, p. 20, 99.

(Continued)

*Primary Examiner* — Djenane M Bayard
(74) *Attorney, Agent, or Firm* — Sughrue Mion, PLLC

(57) ABSTRACT

Provided are a chat system for realizing good communication between users, a control method for a chat device and a chat server, and an information storage medium. Upon receiving a message, a message transfer unit (11a) transfers the message to a game terminal of a transferring destination, and a stop restriction unit (11c) transmits an instruction (restricting instruction) to restrict a chat function stop processing on the game terminal which has transmitted the message, thereby restricting stopping of the chat function on the game terminal. A stop restricting time calculation unit (11d) calculates a period (stop restricting period T) for restricting the chat function stop processing in accordance with the character count (p) of the received message and the judgment by a keyword presence/absence judgment unit (11e), and a timer unit (11b) specifies a stop restricting time end time. Upon arrival of the stop restricting time end time, the stop restriction unit (11c) transmits an instruction (restriction release instruction) to release the restriction on the chat function stop processing.

18 Claims, 8 Drawing Sheets

U.S. PATENT DOCUMENTS

| | | |
|---|---|---|
| 2003/0154251 A1* | 8/2003 | Manabe et al. ............... 709/204 |
| 2004/0179039 A1* | 9/2004 | Blattner et al. ............... 345/758 |
| 2005/0027676 A1* | 2/2005 | Eichstaedt et al. ................. 707/1 |
| 2005/0132011 A1 | 6/2005 | Muller et al. |
| 2005/0149622 A1* | 7/2005 | Kirkland et al. ............. 709/207 |
| 2005/0267942 A1 | 12/2005 | Quinn et al. |
| 2009/0100141 A1* | 4/2009 | Kirkland et al. ............. 709/206 |

FOREIGN PATENT DOCUMENTS

| | | |
|---|---|---|
| JP | 2002-319975 A | 10/2002 |
| JP | 2003-164669 A | 6/2003 |
| JP | 2003-290549 A | 10/2003 |
| JP | 3924101 B2 | 3/2007 |
| KR | 2003-0079370 A | 10/2003 |
| KR | 10-2005-0099909 A | 10/2005 |

OTHER PUBLICATIONS

"Kyosei Shuryo Penalty System Donyu", [ on line], Gamepot Inc., Mar. 22, 2005, internet <URL: http://www.pangya.jp/050322penalty/>.

Schulzrinne, H. "Indication of Message Composition for Instant Messaging" Columbia U. , Internet Engineering Task Force. Jan. 1, 2005. XP015009765.

* cited by examiner

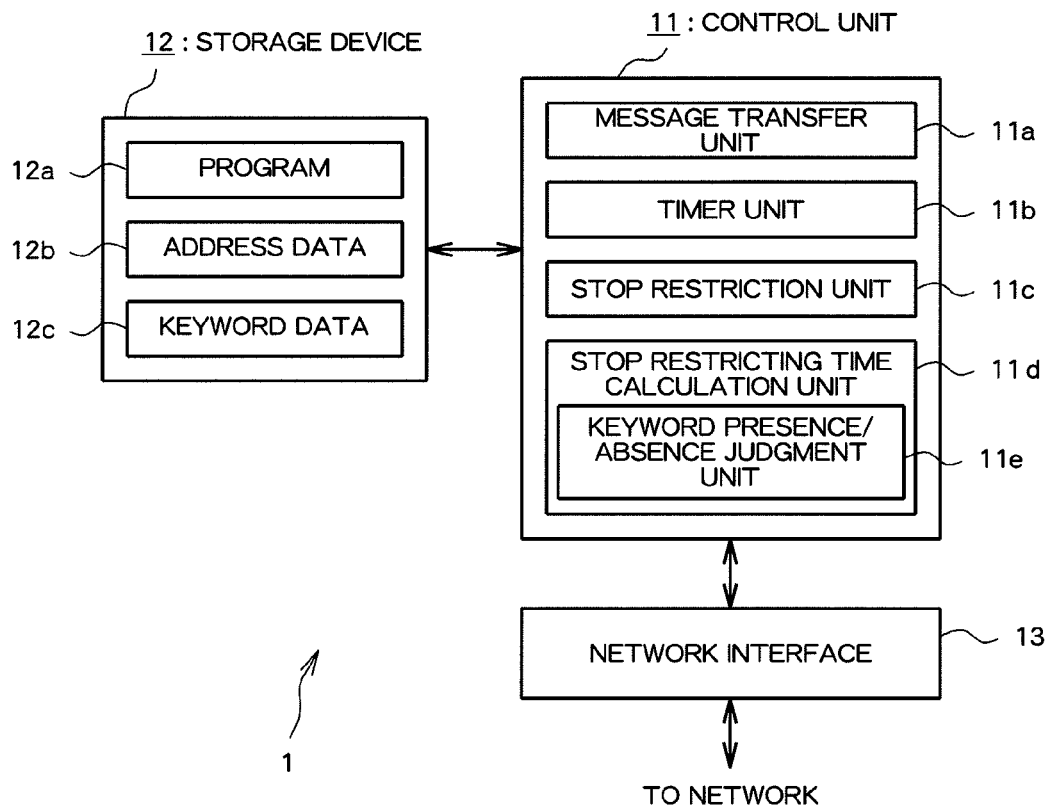

FIG.14

| USER ID | KEYWORD | ADDED TIME |
|---|---|---|
| ~ | ○○○ | ~ |
| | ×× × | |
| | △△ | |
| ~ | ×△ | |
| ~ | ×○ | |
| | △○ | |
| | □□ | |
| | ××○ | |

CHAT SYSTEM, CHAT DEVICE, CHAT SERVER CONTROL METHOD, AND INFORMATION STORAGE MEDIUM INCLUDING CHAT STOP LIMITING CAPABILITY BASED ON KEYWORD

CROSS REFERENCE TO RELATED APPLICATION

This application is a National Stage of International Application No. PCT/JP2006/325103 filed on Dec. 15, 2006, claiming priority based on Japanese Patent Application No. 2006-001545, filed Jan. 6, 2006, the contents of all of which are incorporated herein by reference in their entirety.

This application is related to my prior co-pending application Ser. No. 12/094,654 which entered the National Stage on May 22, 2008.

TECHNICAL FIELD

The present invention relates to a chat system for transferring and receiving messages between chat devices, a control method for a chat device and a chat server, and an information storage medium.

BACKGROUND ART

Up to now, messages have been transmitted/received between chat devices to perform communication (chat) in real time. In particular, in an online game, it is common to equip each game terminal with a chat function in order to make the game more exciting, and various ideas are used for promoting communication between users. Patent Document 1 introduces a game device (chat device) which optimizes a time for displaying a message in accordance with the count of characters in the inputted message.

Patent Document 1: JP 2003-290549 A

DISCLOSURE OF THE INVENTION

Problem to be Solved by the Invention

However, according to the above chat device, a user of each chat device can stop chatting at any time, so if, for example, the user stops chatting immediately after posting a message, another user cannot be provided with a chance to reply, which leads to an inequality between users.

One of various possible measures against this is to prohibit a user who has posted a message from stopping the chat function for a given period of time. The given period may be a fixed period of time or may be determined in accordance with the amount of the user's message. This secures a user who receives a message a chance to reply, and reduces the inequality mentioned above.

Still, depending on what message is received, there are cases where the given period of time is not long enough for a user to input a satisfactory reply message. For instance, in the event that one person is writing a lengthy counterargument to a one-word message, the user who has posted the message can stop the chat function and only a part of what that one person wants to say is delivered. The resultant feeling of inequality about not being able to transmit a reply message to the user could taint communication between the users.

The present invention has been made in view of the above problem, and an object of the present invention is therefore to provide a chat system for accomplishing good communication between users, a control method for a chat device and a chat server, and an information storage medium.

Means for Solving the Problem

In order to solve the above-mentioned problem, according to the present invention, a chat system includes a plurality of chat devices each including: a message input means through which a user inputs a message; a message transmission means which transmits a message input through the message input means; a message reception means which receives a message; a message output means which outputs a message received by the message reception means; and a message reception/output stop means which stops the message reception and output by the message reception means and the message output means in response to a given operation by the user. The chat system includes: a stop restriction means which restricts the message reception/output stop means from stopping the message reception and output; a keyword storage means which stores a keyword or keywords; and a keyword presence/absence judgment means which, when one of the chat devices transmits a message through the message transmission means, judges whether or not any keyword stored in the keyword store means is found in the message. The stop restriction means restricts the reception and output of messages from being stopped in one of the chat devices for a duration of a given chat stop restricting time, which is determined in accordance with the judgment made by the keyword presence/absence judgment means.

The present invention allows each chat device to input/output a message and to transmit/receive messages between chat devices. The present invention also makes it possible to stop the reception and output of messages in the chat device in response to a given operation of the user of the chat device. The present invention has a keyword storage means which stores a keyword, so stopping the message reception and output in the chat device is restricted for the duration of the chat stop restricting time, which is determined as a result of judging for each chat device whether or not a message transferred from the chat device contains the keyword stored in the keyword storage means. The present invention thus makes it possible to judge the contents of a message from the presence or absence of any keyword in the message, and to determine the length of the chat stop restricting time in accordance with the judged contents. This way, a chance to reply to a message is secured appropriately for a user who has received the message, and the unfairness of the user being unable to transmit a reply message can be reduced, thereby making communication between users good. The keyword includes a string of arbitrary characters, for example, a word used when flaming someone.

According to an aspect of the present invention, this chat system may further include a timer means which measures the given chat stop restricting time. In this aspect, the chat stop restricting time can be measured accurately, and stopping the message reception and output in a chat device that has input or transmitted a message can be restricted for the duration of the measured chat stop restricting time.

Further, according to an aspect of the present invention, the keyword storage means, the keyword presence/absence judgment means, and the stop restriction means may be provided in each of the chat devices or in a chat server. The chat server is a server that receives a message transferred from one chat device and transfers the message to another chat device.

According to an aspect of the present invention, in a chat system where the keyword storage means, the keyword presence/absence judgment means, and the stop restriction means are provided in a chat server, each of the chat devices may further have a keyword input means through which the user inputs a keyword and a keyword transmission means which transmits the keyword input through the keyword input means to the chat server, and the keyword storage means may store the keyword transmitted by the keyword transmission means. In this aspect, allowing each user to input and register a keyword individually enables individual users to, for example, specify message contents that, when received, call for setting the chat stop restricting time longer than usual. A chance to reply is thus secured even more appropriately for a user who has received a message, and communication between users is made good.

Further, according to an aspect of the present invention, the chat devices may be video game terminals and the chat server may be a video game server.

Further, according to the present invention, a method of controlling chat devices for use in a chat system includes the steps of: inputting a message; transmitting the input message; receiving the message; outputting the received message; stopping the message reception and output in response to a given operation by a user; reading stored data out of a keyword storage means, which stores a keyword or keywords; judging whether or not any read keyword is found in a message to be transmitted; and restricting the reception and output of messages from being stopped for a duration of a given chat stop restricting time, which is determined in accordance with the judgment.

Further, an information storage medium according to the present invention is a computer-readable information storage medium storing a program which causes a computer to function as: a message input means through which a message is input; a message transmission means which transmits the input message; a message reception means which receives a message; a message output means which outputs the received message; a keyword storage means which stores a keyword or keywords; a message reception/output stop means which stops the message reception and output in response to a given operation by a user; a keyword presence/absence judgment means which judges whether or not any keyword stored in the keyword storage means is found in a message transmitted by the message transmission means; and a stop restriction means which restricts the reception and output of messages from being stopped for a duration of a given chat stop restricting time, which is determined in accordance with the judgment made by the keyword presence/absence judgment means.

The present invention makes it possible for each chat device to restrict the reception and output of messages in the chat device from being stopped.

Further, according to the present invention, a method of controlling a chat server for use in a chat system including a plurality of chat devices includes the steps of: receiving a message from each of the chat devices; transferring the received message to another of the plurality of chat devices; reading stored data out of a keyword storage means, which stores a keyword or keywords; judging whether or not any read keyword is found in the message transferred from each chat device; and restricting the reception and output of messages from being stopped for a duration of a given chat stop restricting time, which is determined in accordance with the judgment.

Further, an information storage medium according to the present invention is a computer-readable information storage medium storing a program which causes a computer for use in a chat system including a plurality of computers to function as: a message reception means which receives a message transferred from each of the computers; a message transferring means which transfers the received message to another of the plurality of computers; a keyword storage means which stores a keyword or keywords; a keyword presence/absence judgment means which judges whether or not any keyword stored in the keyword storage means is found in a message transmitted by a message transmission means of each of the computers; and a stop restriction means which restricts the reception and output of messages from being stopped in the computer for a duration of a given chat stop restricting time, which is determined in accordance with the judgment made by the keyword presence/absence judgment means.

According to the present invention, a chat server judges for each chat device whether or not any keyword is contained in a message transferred from the chat device to restrict the reception and output of messages in the chat device from being stopped. This makes it possible to reduce processing executed in each chat device and lighten the load on each chat device.

BRIEF DESCRIPTION OF THE DRAWINGS

FIG. 3 is a configuration/function block diagram of a game server according to Embodiment 1 of the present invention.

FIG. 4 is a diagram showing an example of a table where user IDs are stored in association with address data.

FIG. 5 is a diagram showing an example of keyword data.

FIG. 14 is a diagram showing an example of keyword data.

BEST MODE FOR CARRYING OUT THE INVENTION

An embodiment (Embodiment 1) of the present invention will be described below in detail with reference to the drawings.

Figure 1:
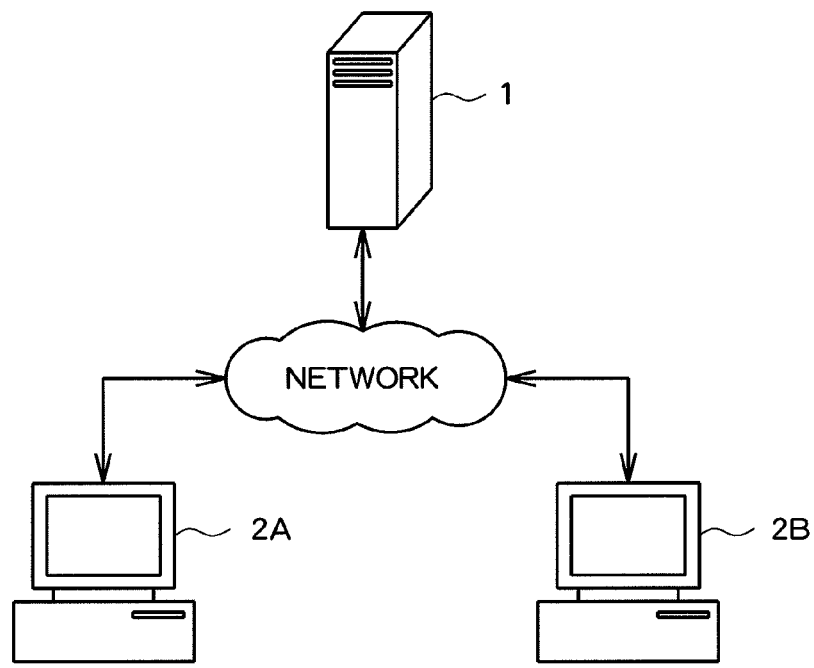
FIG. 1 is a diagram showing an example of the overall configuration of a chat system according to an embodiment of the present invention.

FIG. 1 is a diagram showing the overall configuration of a chat system according to an embodiment of the present invention. As shown in FIG. 1, this chat system includes a game server 1 and game terminals 2A and 2B. The game server 1 and the game terminals 2 can communicate with one another via a network. In the following description, the game terminals 2A and 2B will be referred to as "game terminal 2" if there is no need for particular distinction between them.

The game server 1 is a known server computer mainly including a microprocessor, various storage devices, and a data communication device, and serves to manage and relay a chat performed between the game terminals 2. The game terminals 2A and 2B are known computers such as a household game machine, an arcade game machine, a personal computer, a cell phone, or a personal digital assistant, which includes a monitor, input means such as a keyboard and a controller, a processor, various storage devices, and a data communication device. The game terminals 2A and 2B are used by users to perform a chat (conversation performed by exchanging message character strings).

Figure 2:
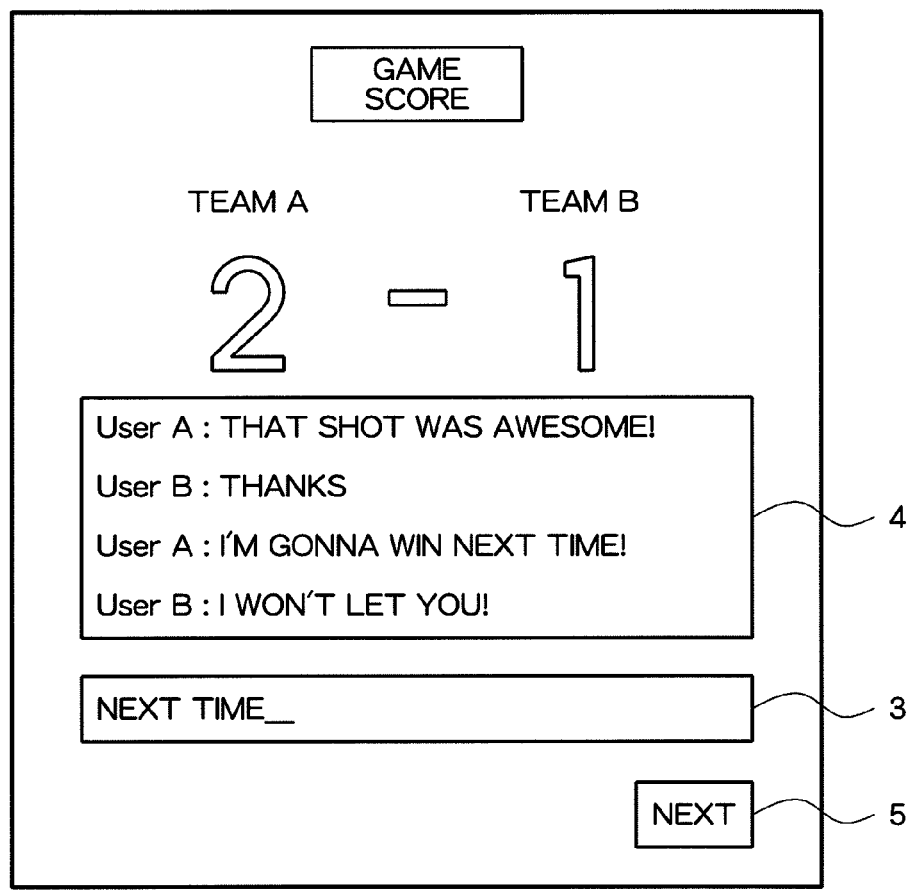
FIG. 2 is a diagram showing an example of a chat window.

FIG. 2 shows an example of a chat window that is displayed on the monitor of the game terminal 2A in a multi-player online game. The same window is also displayed on the game terminal 2B. The example shown herein is a chat window for a chat performed in a state in which a match result is displayed after a soccer match has ended. As shown in FIG. 2, a message input field 3 is placed in a lower part of the window, and a chat log field 4 is placed above the message input field 3. A user A of the game terminal 2A (hereinafter, the user of the game terminal 2A is referred to as user A whereas the user of the terminal 2B is referred to as user B) inputs a message in the message input field 3 and executes an enter operation, such as clicking on a not-shown "transmit" button, to enter the message. When the user A enters the message, the message is output and displayed in combination with the user ID of the user A (here, "User A") in the chat log field 4 as a post by the user A. At this point, the message is similarly output and displayed in the chat log field 4 of the chat window displayed on the game terminal 2B, and the user B inputs and transmits a message in response to the displayed message. The users A and B thus chat with each other by inputting messages to their respective message input fields 3 while looking at their own chat log fields 4, thereby having a conversation about, for example, the highlights of the game. Specifically, a message input in one game terminal 2 is, after an enter operation is executed, transmitted to the game server 1 along with information such as identification data (e.g., user ID) of a chat partner user. The game server 1, which stores in advance identification data of each user in association with the network address of the game terminal 2 of the user, transfers the message to a network address that is associated with the transmitted identification data, namely, the game terminal 2 of the chat partner user. The game terminal 2 of the chat partner user receives the message, and outputs and displays the message in its chat log field 4.

When the user executes a chat stop operation in the window shown in FIG. 2, such as clicking on a button 5 labeled "next" placed at the lower right of the drawings, the chat function is stopped (terminated). The game terminal 2 whose chat function has been stopped (terminated) cannot receive messages transferred from other game terminals 2 to this game terminal 2. A different window from the chat window may be displayed in this state. The button 5 can take any form as long as it is a chat function stop instructing image for giving an instruction to stop the chat function. The button 5 in FIG. 2 is a rectangular image labeled with a character string "next" as an example of the chat function stop instructing image.

This game server 1 includes a known timer, and stores a time at which a message transferred from one game terminal 2 is received in a storage device such as RAM. The game server 1 also calculates a stop restricting time base on a content of the received message. Here, the calculation of the stop restricting time is based on the character count of the message and the presence or absence of a given character string (keyword) in the message. The stop restricting time is a time period during which the game server 1 restricts stopping of the chat function through the chat stop operation described above. Specifically, for the duration of the stop restricting time, the game server 1 changes the display mode of the button 5 shown in FIG. 2 in a manner that makes it impossible for the user to click on the button 5, or invalidates processing that is executed when the button 5 is clicked on. Examples of the display mode change include displaying the button 5 translucently, erasing the button 5 completely, and displaying the button 5 in a smaller size. In short, the game server 1 restricts the stopping of the chat function through the chat stop operation by making it impossible for the user of the game terminal 2 to execute the chat stop operation altogether or by invalidating processing that is executed through the chat stop operation. The stop restricting time may be calculated based solely on the presence or absence of any keyword in a message regardless of the character count of the message.

The game server 1 thus transfers a message received from one game terminal 2 to a partner user's game terminal 2 while simultaneously recording the reception time of the message and calculating the stop restricting time based on the character count of the message and the presence or absence of any keyword in the message. The message reception time is used as the start time of the stop restricting time, and the stopping of the chat function through the chat stop operation is restricted in the game terminal 2 that has transmitted the message until the stop restricting time passes. In other words, the game server 1 prevents a user from stopping (terminating) the chat function of their game terminal 2 immediately after transmitting a message.

The above enables this chat system to restrict a user who transmits a message from executing the chat stop operation for a given period of time and to secure a user who receives the message a chance to transmit a reply message appropriately in accordance with the contents of the received message. As a result, good communication between users is realized.

The following is a more detailed description on the configuration and operation of this system.

FIG. 3 is a configuration/function block diagram of the game server 1. As shown in FIG. 3, the game server 1 includes a control unit 11, a storage device 12, and a network interface 13. The game server 1 may also include a not-shown input/output unit such as a keyboard, a monitor, a DVD player, and the like, and a not-shown information storage medium such as a DVD-ROM or a CD-ROM. The control unit 11 includes function blocks which are a message transfer unit 11a, a timer unit 11b, a stop restriction unit 11c, and a stop restricting time calculation unit 11d. These function blocks are realized by a given program 12a stored in the storage device 12 being executed on the game server 1. The program 12a and keyword data 12c described later may be stored in the computer-readable storage medium mentioned above, such as a DVD-ROM or a CD-ROM.

The control unit 11, including for example a known CPU receives a message from one game terminal 2, and also identifies the transferring destination of the message, and transfers the message to the identified game terminal 2. The control unit 11 also counts the character count of the received message, and judges whether or not the message contains any given keywords, and calculates the stop restricting time in accordance with the character count and the judgment. The control unit 11 then restricts the stopping of the chat function through the chat stop operation in the game terminal 2 that has transmitted the message. As mentioned above, the control unit 11 includes functions which correspond to the message transfer unit 11a, the timer unit 11b, the stop restriction unit 11c, and the stop restricting time calculation unit 11d. Specific processing of these units will be described later.

The storage device 12 includes, for example, a known memory such as RAM. The storage device 12 stores the program 12a, which is output to the control unit 11. The storage device 12 also stores a user ID and address data 12b such as an IP address of the game terminal 2 corresponding to the user, which are acquired by a known art upon the start of a chat. A user ID and address data 12b are held in association with each other, such as in a table shown in FIG. 4. The storage device 12 further stores the keyword data 12c, which is output to the control unit 11. The keyword data 12c holds one or more keywords in association with their respective added times, as shown in a table of FIG. 5. An added time of a keyword is the length of time added to the stop restricting time in the case where the keyword is contained in a message. Although an added time is set for each keyword here, the same added time may be set for every keyword instead.

The network interface 13 is a communication device, for example, a known network card. The network interface 13 transmits and receives data over a network.

Now, specific processing of the respective units of the control unit 11 will be described.

The message transfer unit 11a mainly includes a known CPU. The message transfer unit 11a is realized by execution of the program 12a. The message transfer unit 11a receives a message and the user ID of a chat partner (the user B) from the game terminal 2A through the network interface 13. The message transfer unit 11a then refers to the table of FIG. 4 and transfers the message to an address indicated by the address data 12b corresponding to the received user ID, namely, the game terminal 2B.

The timer unit 11b mainly includes a known CPU and a timer. The time unit 11b is realized by execution of the program 12a. The timer unit 11b measures a time (a stop restricting time start time) at which the message is received by the message transfer unit 11a, and identifies a time (a stop restricting time end time) at which the above-mentioned stop restricting time elapses since the stop restricting time start time.

The stop restricting time calculation unit 11d mainly includes a known CPU. The stop restricting time calculation unit 11d is realized by execution of the program 12a. The stop restricting time calculation unit 11d counts the character count of the message received by the message transfer unit 11a. The stop restricting time calculation unit 11d also judges whether or not the message contains a keyword, or any of a plurality of keywords, held in the keyword data 12c of FIG. 5. The stop restricting time calculation unit 11d then calculates a stop restricting time T based on the message's character count and the judgment about the presence or absence of any keyword. The presence or absence of a keyword is judged by a keyword presence/absence judgment unit 11e, which is included in the stop restricting time calculation unit 11d.

More specifically, the stop restricting time calculation unit 11d counts a character count p of the received message and calculates a basic restricting time L. The basic restricting time L is the length of time calculated in accordance with the character count p of characters contained in the message, and is obtained by multiplying the character count p by a per-character stop restricting time m. The basic restricting time L is obtained here by a numerical expression, but the present invention is not limited thereto. For instance, the basic restricting time L that is associated with the message character count p may be obtained by reference to a table where the message character count p and the basic restricting time L are stored in association with each other.

The keyword presence/absence judgment unit 11e then judges whether or not a keyword ki, or any of a plurality of keywords ki, held in the keyword data 12c is contained in the message and, when it is, further judges a count ri, which indicates how many times a keyword appear in a message. When the message contains the keyword ki, the keyword presence/absence judgment unit 11e identifies an added time ti that is associated with the keyword ki from the keyword data 12c. The identified added time ti is multiplied by the above count ri to calculate a total added time Ti for this keyword ki. In the same manner, the total added time Ti is calculated for every keyword ki that is held in the keyword data 12c, and all the calculated total added times Ti are added to the basic restricting time L to obtain the stop restricting time T. The symbol "i" represents an integer equal to or larger than 1 and equal to or smaller than n, and n represents the number of keywords contained in the keyword data 12c. Specifically, the stop restricting time T is calculated by the following Expression (1):

$$T = L + \Sigma Ti \qquad (1)$$

where S represents a sum regarding i.

The stop restriction unit 11c mainly includes a known CPU. The stop restriction unit 11c is realized by execution of the program 12a. When the message transfer unit 11a receives the message, the stop restriction unit 11c transmits various restriction instructions for restricting the user A from executing the chat stop operation to the game terminal 2A. For example, the stop restriction unit 11c transmits instructions for making it impossible to click on the button 5 in FIG. 2 by turning the button 5 translucent or by making the button 5 disappear, or the stop restriction unit 11c transmits instructions to invalidate processing that is executed by clicking on the button 5 while leaving the button 5 in a clickable state. In short, the stop restriction unit 11c transmits to the game terminal 2A instructions for restricting the user A from stopping the reception of messages and the output of messages in the game terminal 2A through the chat stop operation.

Upon the arrival of the stop restricting time end time, the stop restriction unit 11c transmits a restriction release instruction which instructs cancellation of the above restriction instructions to the game terminal 2A. The stop of the chat function through the user A's chat stop operation is thus restricted from the time the message is received until the stop restricting time passes. Described above are the specifics of the processing in the game server 1.

Figure 6:
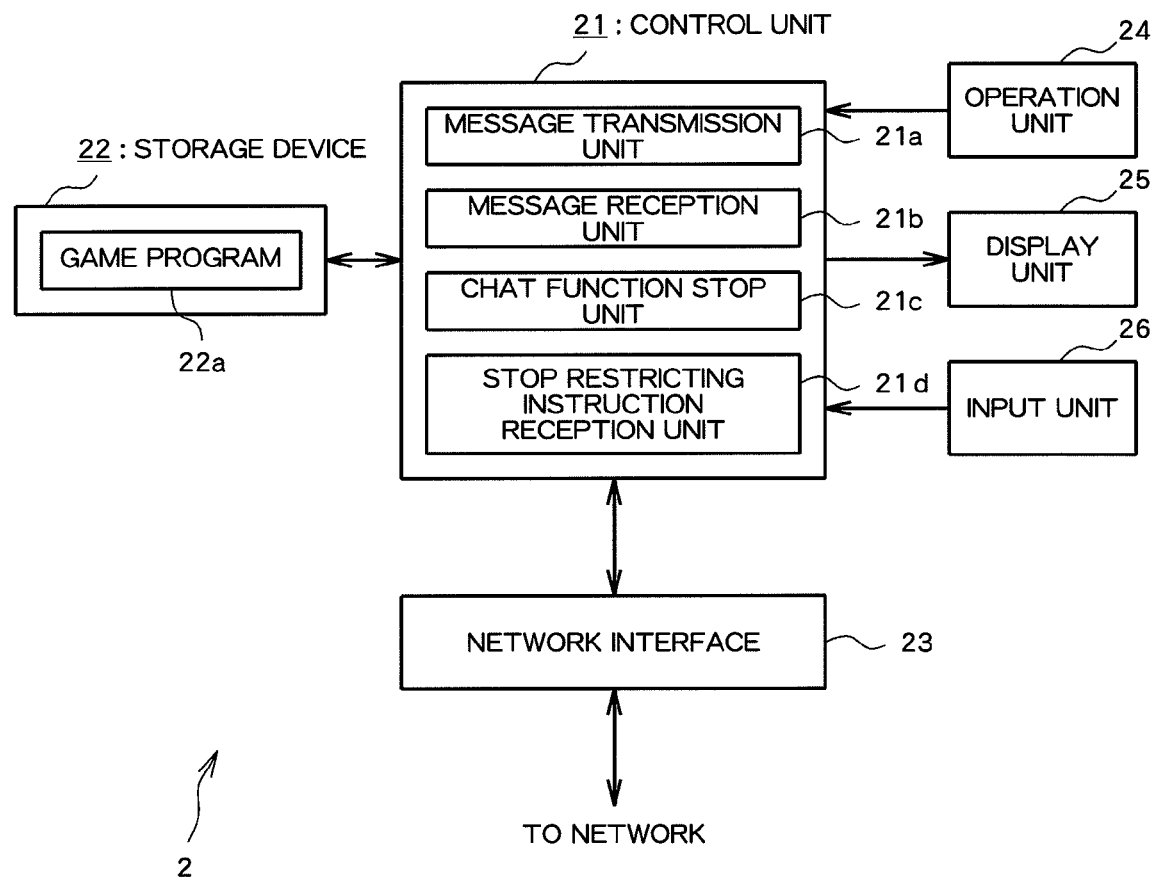
FIG. 6 is a configuration/block diagram of a game terminal according to Embodiment 1 of the present invention.

FIG. 6 is a configuration/function block diagram of the game terminals 2. As shown in FIG. 6, each game terminal 2 includes a control unit 21, a storage device 22, a network interface 23, an operation unit 24, which includes a controller, a keyboard, or the like, a display unit 25, which is a monitor or the like, and an input unit 26, which is a DVD player or the like. The control unit 11 includes function blocks constituted by a message transmission unit 21a, a message reception unit 21b, a chat function stop unit 21c, and a stop restricting instruction reception unit 21d. These function blocks are realized by execution of a given game program 22a, which is stored in the storage device 22, on the game terminal 2. The game program 22a may be stored instead in a computer-readable storage medium such as a DVD-ROM.

The control unit 21 includes, for example, a known CPU. The control unit 21 transmits a message input through the operation unit 24 to the game server 1 along with the user ID of a chat partner. The control unit 21 also receives a message transferred from the game server 1 and outputs the message to the display unit 25. In response to the user's chat stop operation, the control unit 21 stops the reception and output of messages transferred by the game server 1. This control unit 21 includes the message transmission unit 21a, the message reception unit 21b, the chat function stop unit 21c, and the stop restricting instruction reception unit 21d as mentioned above. Specific processing of the respective units will be described later.

The storage device 22 includes a known memory such as RAM. The storage device 22 stores the program 22a, which is output to the control unit 21. The network interface 23 is a communication device, for example, a known network card. The network interface 23 transmits and receives data over a network.

Now, specific processing of the respective units of the control unit 21 is described.

The message transmission unit 21a, the message reception unit 21b, the chat function stop unit 21c, and the stop restricting instruction reception unit 21d mainly include a known CPU, and are realized by execution of the game program 22a. When a message input through the operation unit 24, which is a keyboard, a controller, or the like, is entered by the above-mentioned enter operation such as clicking on the transmit button, the message transmission unit 21a transmits the message to the game server 1 along with the user ID of a chat partner. The message reception unit 21b receives a message transferred by the game server 1, and outputs the message to the chat log field 4 which is output and displayed on the display unit 25. The chat function stop unit 21c executes, in response to an input made by the chat stop operation through the operation unit 24, processing relevant to the stopping of the chat function (chat function stop processing), thus stopping the message reception and output transferred by the game server 1. The stop restricting instruction reception unit 21d receives the above-mentioned restriction instructions and restriction release instruction from the game server 1, and restricts the chat function stop unit 21c from executing the chat function stop processing from the time the restriction instructions are received until the time the restriction release instruction is received. In short, the stop restricting instruction reception unit 21d restricts the chat function stop processing from the time of transmission of a message until the elapse of the stop restricting time. Described above are the specifics of the processing in the game terminals 2.

Figure 7:
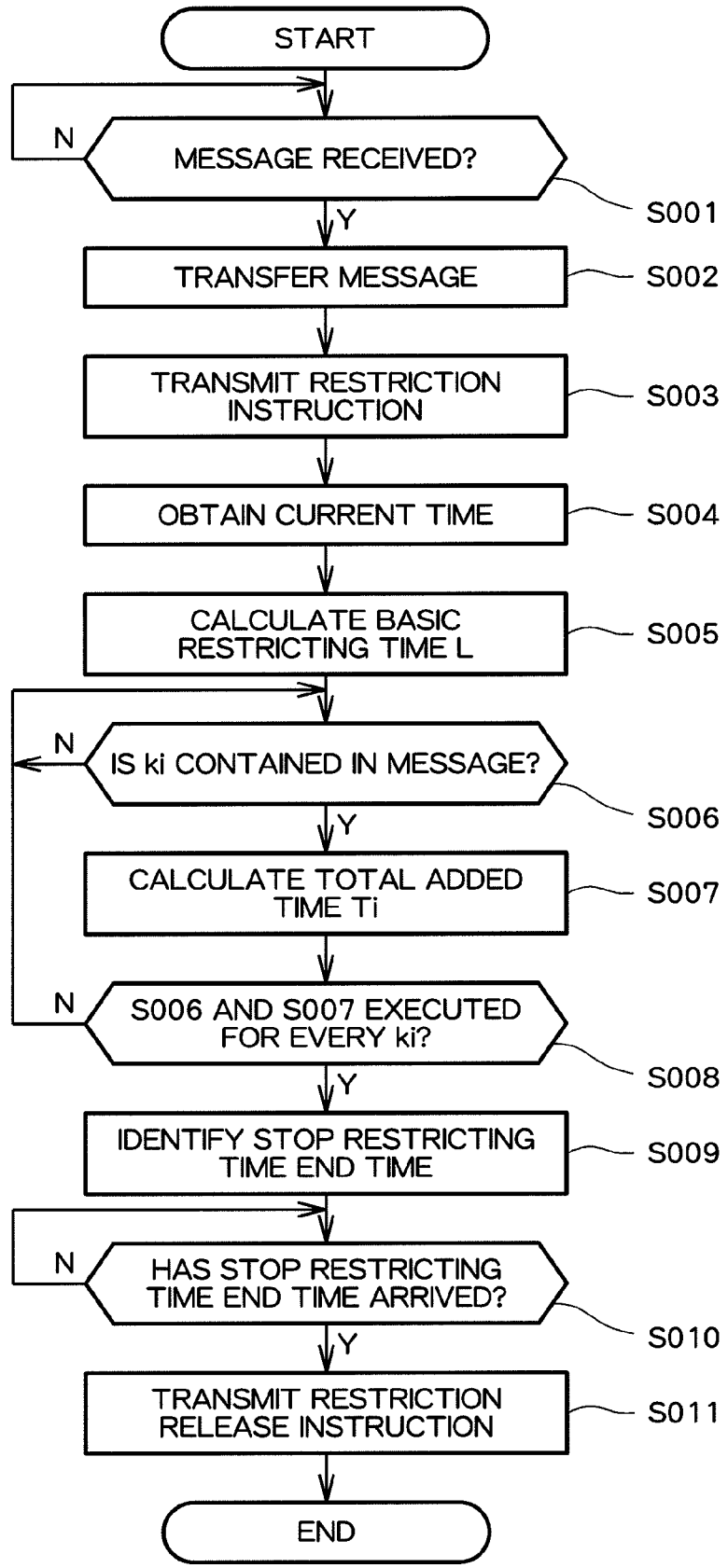
FIG. 7 is a flow chart showing an example of message transferring and chat function stop restricting processing in the game server according to Embodiment 1 of the present invention.

A more detailed description will next be given on the processing of the game server 1. FIG. 7 is a flow chart showing an example of the message transferring processing and the chat function stop restricting processing that are executed on the game server 1. As shown in FIG. 7, the game server 1 monitors for the reception of messages from the game terminals 2 (S001). When the message transfer unit 11a receives a message, the message transfer unit 11a refers to the above-mentioned table of FIG. 4 to identify an address associated with the user ID of a chat partner that has been received along with the message, and the message transfer unit 11a transfers the message to the game terminal 2 that has the identified address (S002). The steps so far correspond to details of the message transferring processing. Thereafter, the chat function stop restricting processing is started. The stop restriction unit 11c transmits to the game terminal 2 that is the sender of the message the above-mentioned restriction instructions, namely, instructions for restricting the chat function stop unit 21c of this game terminal 2 from executing the chat function stop processing (S003). The timer unit 11b obtains the current time upon receipt of the message (S004).

The stop restricting time calculation unit 11d counts the character count p of the message, and calculates the basic restricting time L based on the character count p (S005). The keyword presence/absence judgment unit 11e then checks, for each keyword ki held in the keyword data 12c, whether or not the message contains the keyword ki (S006). In the case where the keyword ki is contained, the keyword presence/absence judgment unit 11e judges the count ri to determine how many times the keyword ki appears in the message, and uses the keyword data 12c to identify the added time ti that is stored in association with this keyword ki. The keyword presence/absence judgment unit 11e multiplies the identified added time ti by the above count ri, thus calculating the total added time Ti for this keyword ki (S007). After S006 and S007 are executed for every keyword ki that is contained in the message (Y in S008), the stop restricting time calculation unit 11d calculates the stop restricting time T using the above Expression (1), and identifies a time at which the calculated stop restricting time T elapses since the obtained current time, namely, the stop restricting time end time (S009).

Upon the arrival of the stop restricting time end time (Y in S010), the stop restriction unit 11c transmits the above-mentioned restriction release instruction to the game terminal 2 that is the sender of the message, thereby releasing the restriction on the chat function stop processing in this game terminal 2 (S011). Described above are the specifics of the message transferring processing and the chat function stop restricting processing that are executed by the game server 1.

According to this, the contents of a received message can be judged from the presence or absence of any given keyword in the message, and the length of the stop restricting time can be determined in accordance with the judged contents. A chance to transmit a reply message is thus secured appropriately for a user who has received a message, thereby reducing the unfairness of the user being unable to transmit a reply message, and consequently making communication between users good. S002 through S004 are executed in response to the reception of a message by the message transfer unit 11a, and do not need to be executed in this order.

Described above are the specifics of an embodiment (Embodiment 1) of the present invention.

Another embodiment (Embodiment 2) of the present invention will be described next. In Embodiment 1, the timer unit 11b, the stop restriction unit 11c, the stop restricting time calculation unit 11d, the keyword presence/absence judgment unit 11e, and the keyword data 12c are included in the game server 1, and it is the game server 1 that restricts the stopping of the chat function through the chat stop operation and judges the presence or absence of any keyword in a message. In Embodiment 2, on the other hand, each game terminal 2 has these functions, so the game terminal 2 that is the sender of a message restricts by itself the stopping of the chat function through a chat stop operation whereas the game server 1 executes only the message transferring processing. Embodiment 2 is described below with reference to the drawings. In the following description, the reference symbols used in the Embodiment 1 will be cited for components having the same names.

A chat system according to Embodiment 2 has the same overall configuration as the configuration shown in FIG. 1. A chat system according to Embodiment 2 includes the game terminals 2A and 2B and the game server 1. The user of each game terminal 2 performs a chat by inputting/outputting and transmitting/receiving messages in a chat window such as the one shown in FIG. 2 in Embodiment 1.

Figure 8:
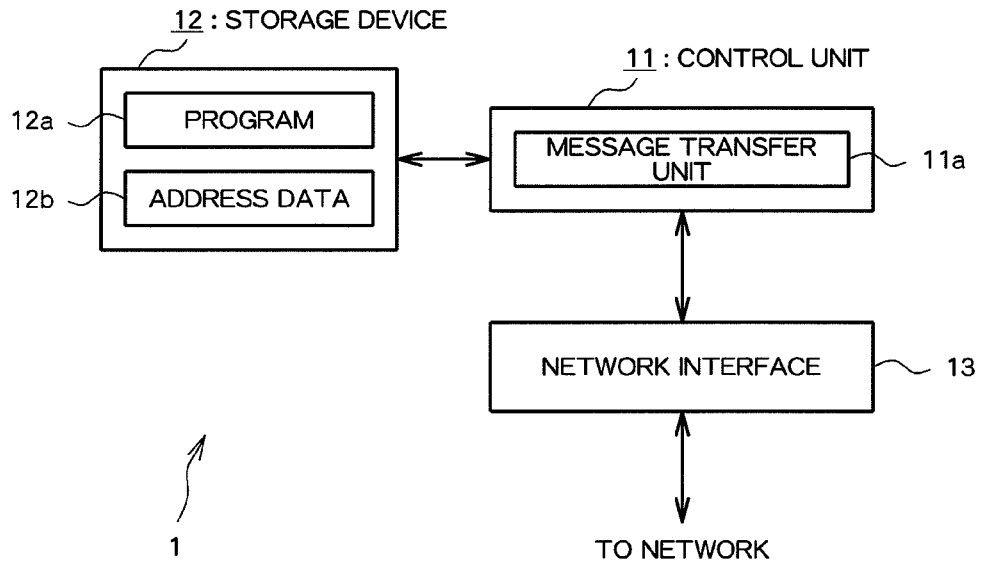
FIG. 8 is a configuration/function block diagram of a game server according to Embodiment 2 of the present invention.

FIG. 8 is a configuration/function block diagram of the game server 1. As shown in FIG. 8, the game server 1 includes a control unit 11, a storage device 12, and a network interface 13. The game server 1 may also include a not-shown input/output section such as a keyboard, a monitor, a DVD player, and the like, and a not-shown information storage medium such as a DVD-ROM or a CD-ROM. The control unit 11 includes a function block which is a message transfer unit 11*a*. This function block is realized by execution of the given program 12*a*, which is stored in the storage device 12, on the game server 1. The program 12*a* may be stored in the computer-readable storage medium mentioned above, such as a DVD-ROM or a CD-ROM. The control unit 11 includes for example, a known CPU. The control unit 11 receives a message from one game terminal 2, and identifies the transferring destination of the message to transfer the message to the identified game terminal 2. The control unit 11 includes the functions of the message transfer unit 11*a* as mentioned above. The message transfer unit 11*a* mainly includes a known CPU, and is realized by execution of the program 12*a*. The message transfer unit 11*a* receives a message from the game terminal 2A along with the user ID of a chat partner (the user B) through the network interface 13. The message transfer unit 11*a* refers to the table of FIG. 4 which is stored in the storage device 12, and transfers the message to an address indicated by address data that is associated with the received user ID, namely, the game terminal 2B.

The storage device 12 includes a memory such as a RAM, and stores the program 12*a* and the address data 12*b*. The difference from Embodiment 1 is that the storage device 12 of Embodiment 2 does not store the keyword data 12*c*. The network interface 13 in Embodiment 2 is the same as the one in Embodiment 1. Described above are the specifics of processing executed by the game server 1 of Embodiment 2.

Figure 9:
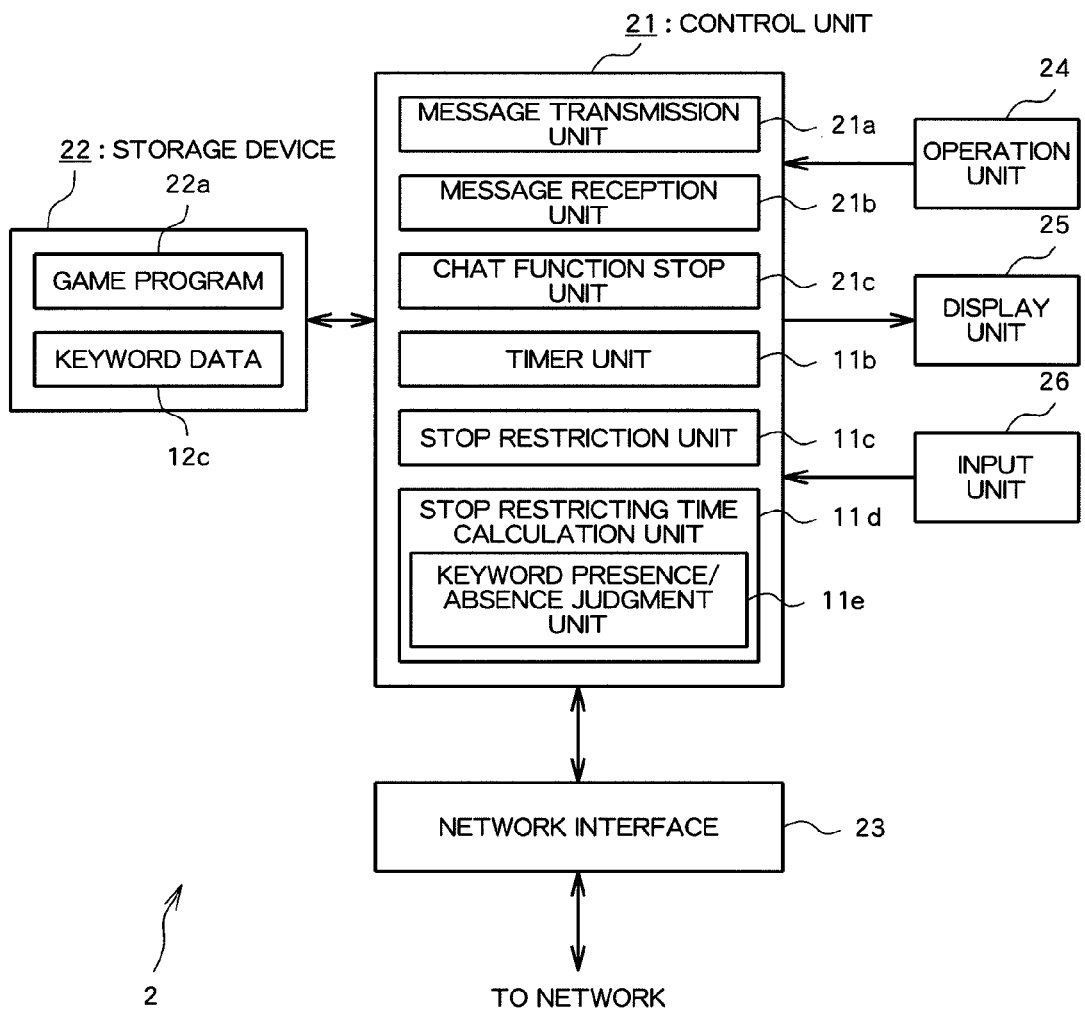
FIG. 9 is a configuration/function block diagram of a game terminal according to Embodiment 2 of the present invention.

FIG. 9 is a configuration/function block diagram of the game terminals 2. As shown in FIG. 9, each game terminal 2 includes the control unit 21, the storage device 22, the network interface 23, the operation unit 24, which includes a controller, a keyboard, or the like, the display unit 25, which is a monitor or the like, and the input unit 26, which is a DVD player or the like. The control unit 11 includes function blocks comprising the message transmission unit 21*a*, the message reception unit 21*b*, the chat function stop unit 21*c*, the timer unit 11*b*, the stop restriction unit 11*c*, and the stop restricting time calculation unit 11*d*, which includes the keyword presence/absence judgment unit 11*e*. These function blocks are realized by execution of the given game program 22*a*, which is stored in the storage device 22, on the game terminal 2. The game program 22*a* and the keyword data 12*c* may be stored instead in a computer-readable storage medium such as a DVD-ROM.

The storage device 22 in Embodiment 2 includes a memory such as a RAM and stores the game program 22*a* as in Embodiment 1. The storage device 22 in Embodiment 2 further stores the above-mentioned keyword data 12*c*, which is output to the control unit 21.

The control unit 21 includes, for example, a known CPU. The control unit 21 transmits a message input through the operation unit 24 to the game server 1 along with the user ID of a chat partner and receives a transferred message from the game server 1, which is output to the display unit 25. The control unit 21 also stops the reception and output of messages transferred by the game server 1 in response to the user's chat stop operation. The control unit 21 also counts the character count in a message, and judges whether or not the message contains any given keyword, and calculates the stop restricting time in accordance with the message's character count and the presence or absence of a keyword. The control unit 21 then restricts the stopping of the chat function through the user's chat stop operation for the duration of the calculated stop restricting time. This control unit 21 includes, as mentioned above, the message transmission unit 21*a*, the message reception unit 21*b*, the chat function stop unit 21*c*, the timer unit 11*b*, the stop restriction unit 11*c*, and the stop restricting time calculation unit 11*d*. The stop restricting time calculation unit 11*d* includes the keyword presence/absence judgment unit 11*e*.

The message transmission unit 21*a*, the message reception unit 21*b*, the chat function stop unit 21*c*, the timer unit 11*b*, the stop restriction unit 11*c*, the stop restricting time calculation unit 11*d* and the keyword presence/absence judgment unit 11*e*, mainly include a known CPU, and are realized by execution of the game program 22*a*. When a message input through the operation unit 24, which is a keyboard, a controller, or the like, is entered by the above-mentioned enter operation such as clicking on the transmit button, the message transmission unit 21*a* transmits the message to the game server 1 along with the user ID of a chat partner. The message reception unit 21*b* receives a message transferred by the game server 1, and outputs the message to the chat log field 4 on the display unit 25. The chat function stop unit 21*c* executes, in response to an input made by the chat stop operation through the operation unit 24, processing relevant to the stop of the chat function (chat function stop processing), thus stopping the message reception and output transferred to this game terminal 2.

The timer unit 11*b* measures a time (a stop restricting time start time) at which the message is received by the message transmission unit 21*a*, and identifies a time (a stop restricting time end time) at which the above-mentioned stop restricting time elapses since the reception time.

The stop restricting time calculation unit 11*d* and the keyword presence/absence judgment unit 11*e* execute the same processing as in Embodiment 1 for the message transmitted by the message transmission unit 21*a*, thereby calculating the stop restricting time T. Details of the processing have been described in Embodiment 1, and will be omitted here.

Upon transmission of the message by the message transmission unit 21*a*, the stop restriction unit 11*c* restricts the chat function stop processing, which is executed by the chat function stop unit 21*c* in response to the user's chat stop operation, in other words, processing for stopping the reception of messages and the output of messages. Upon arrival of the stop restricting time end time, the stop restriction unit 11*c* releases the restriction on the chat function stop processing. Described above are the specifics of the processing in the game terminals 2.

Figure 10:
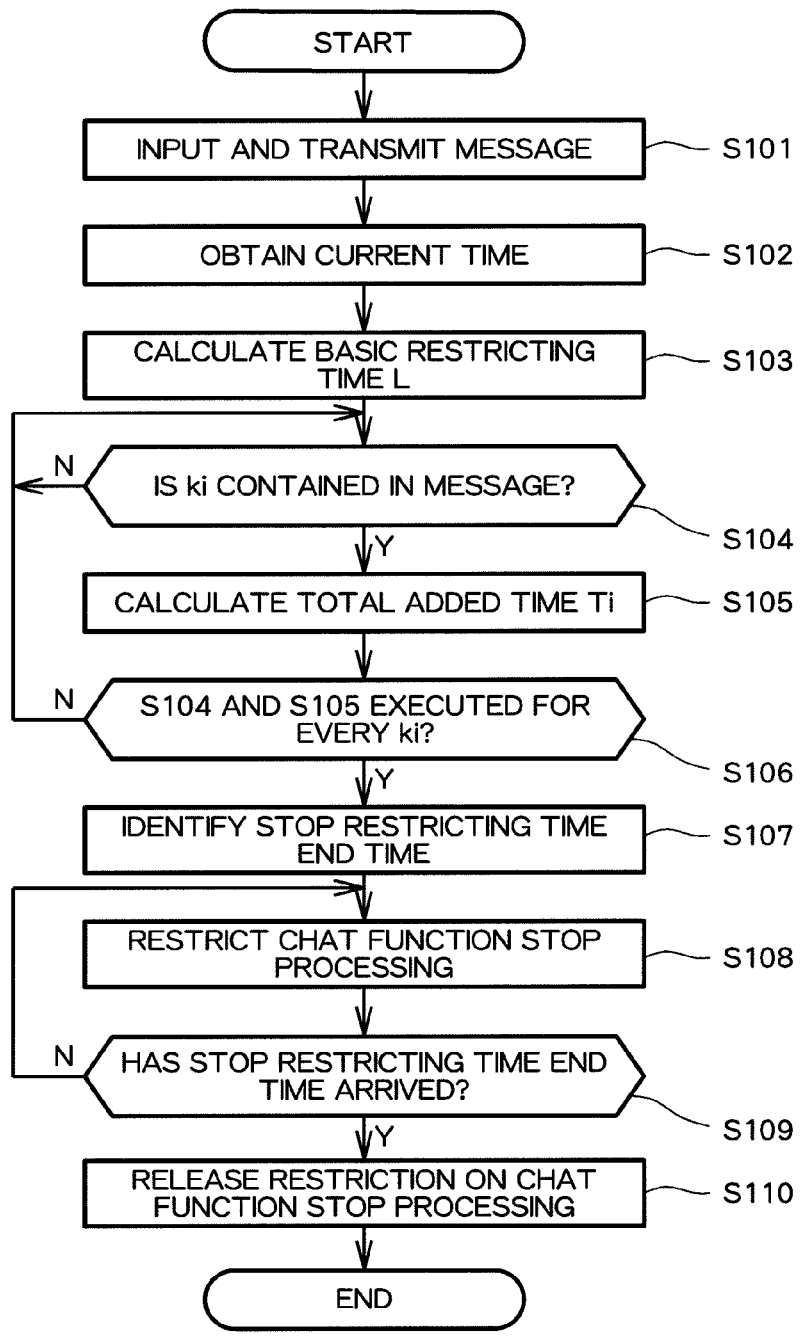
FIG. 10 is a flow chart showing an example of message transmission and chat function stop restricting processing in the game terminal according to Embodiment 2 of the present invention.

A more detailed description will next be given on the processing of the game terminals 2. FIG. 10 is a flow chart showing an example of the message transmitting processing and the chat function stop restricting processing that are executed on the game terminals 2. As shown in FIG. 10, the message transmission unit 21*a* transmits a message input by the user in response to the enter operation such as clicking on the button 5 of FIG. 2 (S101). The steps so far correspond to the message transmitting processing. The game terminal 2 then executes the chat function stop restricting processing. The timer unit 11*b* obtains the current time upon transmission of the message (S102).

The stop restricting time calculation unit 11*d* counts the character count p of the transmitted message, and calculates the basic restricting time L based on the character count p (S103). The keyword presence/absence judgment unit 11*e* checks, for each keyword ki held in the keyword data 12*c*, whether or not the message contains the keyword ki (S104). In the case where the keyword ki is contained, the keyword presence/absence judgment unit 11*e* judges the count ri to determine how many times the keyword ki appears in the message, and uses the keyword data 12*c* to identify the added time ti stored in association with this keyword ki. The keyword presence/absence judgment unit 11e multiplies the identified added time ti by the above count ri, to calculate the total added time Ti for this keyword ki (S105). After S104 and S105 are executed for every keyword ki (Y in S106), the stop restricting time calculation unit 11d calculates the stop restricting time T using the above Expression (1), and the timer unit 11b identifies a time at which the calculated stop restricting time T elapses since the obtained current time, namely, the stop restricting time end time (S107).

After the message is transmitted, the stop restriction unit 11c restricts the chat function stop processing, which is executed by the chat function stop unit 21c in response to the user's operation (S108). S108 is executed accompanying the message transmission, and can be executed at any stage between S101 and S109.

Upon the arrival of the stop restricting time end time (Y in S109), the stop restriction unit 11c releases the restriction on the chat function stop processing (S110). Described above are the specifics of the message transmitting processing and the chat function stop restricting processing that are executed on the game terminals 2.

As has been described, according to Embodiments 1 and 2, the contents of a transmitted message can be judged from the presence or absence of any given keyword in the message, and the length of the stop restricting time can be determined in accordance with the judged contents. A chance to transmit a reply message is thus secured appropriately for a user who has received a message, thereby reducing the unfairness of the user being unable to transmit a reply message, and consequently making communication between users good. For instance, in the case where a user who has received a message is offended by the message and wants to post a lengthy counterargument to the message, the stop restricting time is set longer than usual, even when the received message is one word, if the single word matches a given keyword (e.g., a smear word), thereby providing the user with a chance to make a satisfactory counterargument. The unfairness of an offended user not getting a chance to make a rebuttal to their satisfaction is thus reduced. It also reduces cases where a user is frustrated from not getting a chance to give appropriately worded thanks for a received message when the received message is pleasing. Embodiment 2 lightens the load on the game server 1 by making each game terminal 2 execute the chat function stop restricting processing including the keyword presence/absence judgment. The specifics of Embodiments 1 and 2 have now been described.

The present invention is not limited to what is described in the above embodiments.

Figure 11:
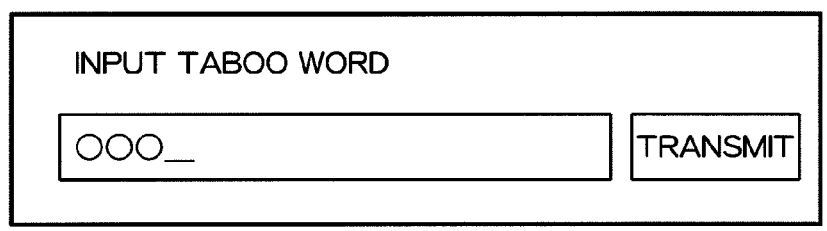
FIG. 11 is a diagram showing an example of a keyword registration window.

For example, the users of the game terminals 2 may individually register keywords by a keyword registration operation prior to the start of a chat. The keyword registration operation is an operation for registering a keyword prior to the start of a chat. In the keyword registration operation, each user has a keyword registration window (FIG. 11) displayed on the display unit 25 of their own game terminal 2 and inputs a keyword they want to register ("taboo word" in FIG. 11) at a predetermined place in the keyword registration window. The user then executes an enter operation such as pressing a "transmit" button in a right part of the window, thereby registering the keyword. This causes the game terminal 2 to transmit the keyword to the game server 1, which stores the keyword. From then on, the stop restricting time is calculated based on whether or not a message transferred to this user contains the registered keyword. The keyword registration window shown in FIG. 11 can take any form as long as it is a user interface for receiving a keyword input by a user.

Figure 12:
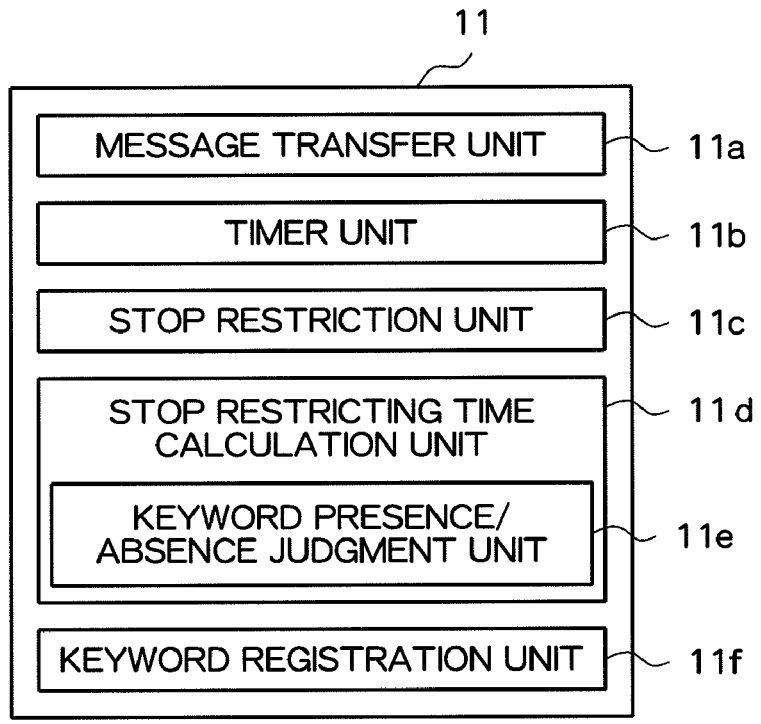
FIG. 12 is a function block diagram of a control unit of a game server.
Figure 13:
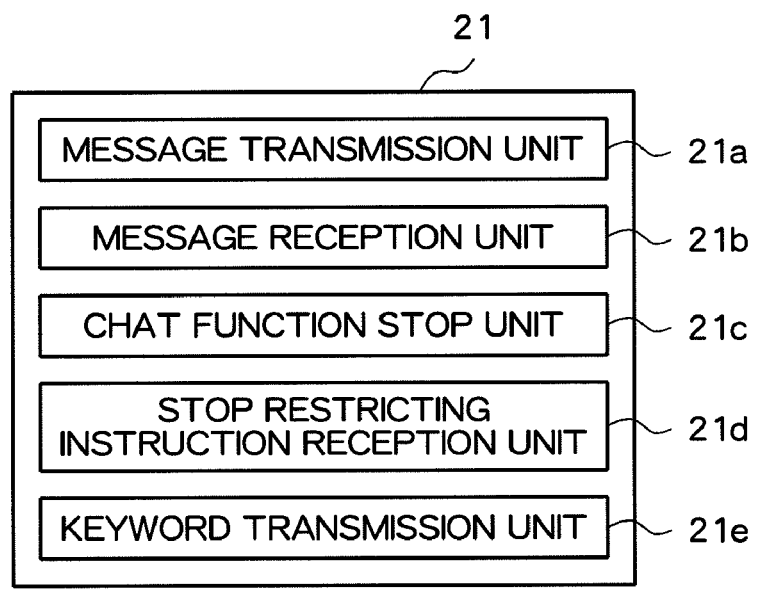
FIG. 13 is a function block diagram of a control unit of a game terminal.
Figure 14:
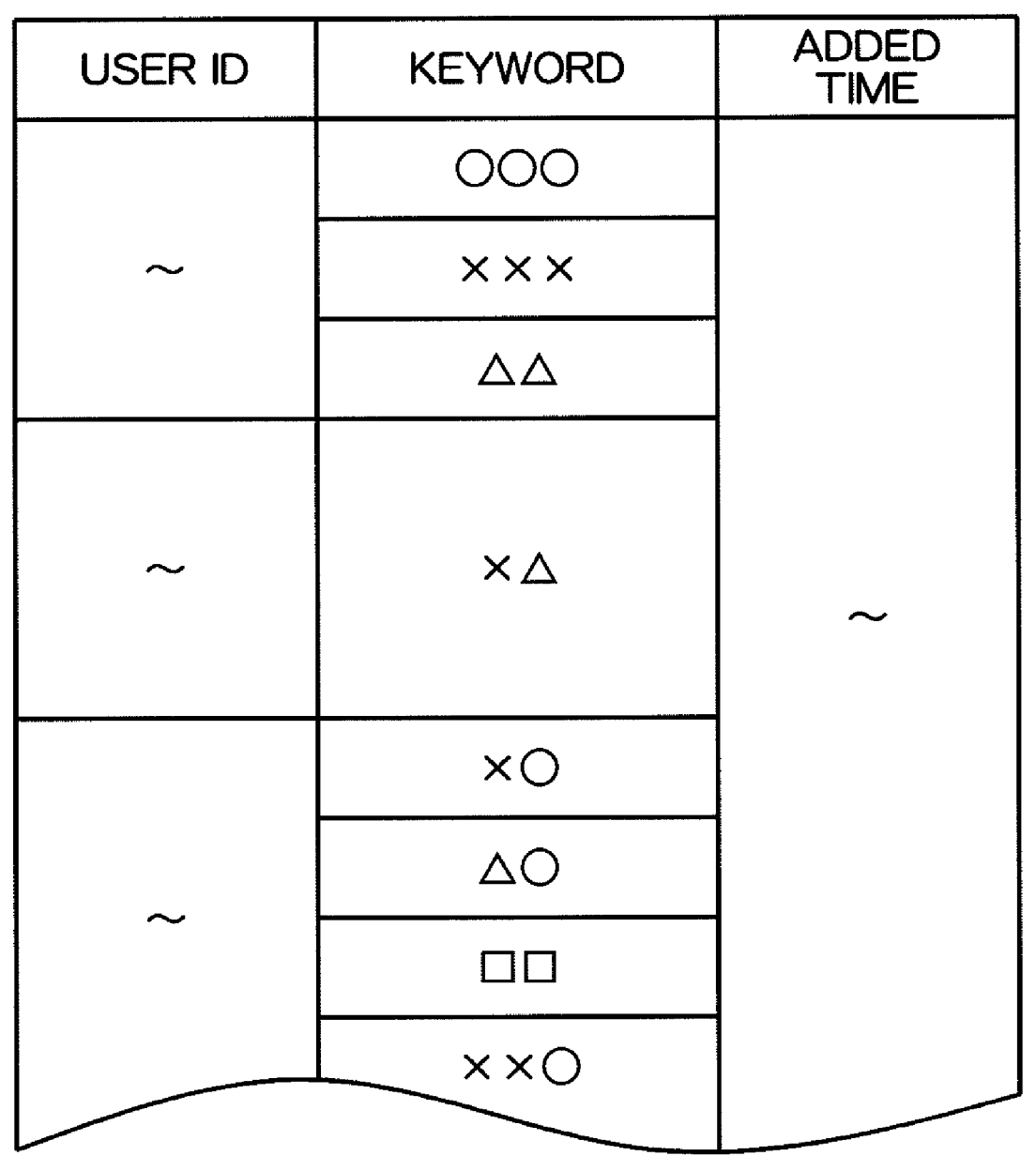

Specifically, this is accomplished in Embodiment 1 by adding a keyword registration unit 11f to the control unit 11 of the game server 1 as shown in FIG. 12, and adding a keyword transmission unit 21e to the control unit 21 of each game terminal 2 as shown in FIG. 13. The keyword transmission unit 21e is realized by execution of the game program 22a. The keyword transmission unit 21e transmits a keyword that is input by the user in the keyword registration window shown in FIG. 11 to the game server 1 along with the user ID of this user in response to the above-mentioned enter operation. The keyword registration unit 11f is realized by execution of the program 12a. The keyword registration unit 11f receives the keyword and the user ID transferred from the game terminal 2 to store the keyword and the user ID in the keyword data 12c of the storage device 12 in association with each other as shown in FIG. 14. The keyword data 12c shown in FIG. 14 stores User IDs in association with the keyword data 12c shown in FIG. 5. A constant added time is set for every keyword in FIG. 14. Alternatively, different added times may be stored in association with the respective keywords.

The game server 1 thus calculates the stop restricting time in an actual chat by executing processing of S006 and S007 in FIG. 7 for each keyword that is stored in association with the user ID of a user to which the received message is to be transferred.

This way, users can individually register keywords, which makes it possible for each user to specify in advance the contents of messages that, when received, call for setting the chat stop restricting time longer than usual. A chance to reply is thus secured even more appropriately for a user who has received a message, and communication between users is made good.

The number of users who performs a chat is not limited to 2. In other words, the present invention may be applied to an embodiment in which the game server 1 is communicatively connected to a plurality of game terminals 2 via the network, and the game sever 1 transfers messages transmitted by a given game terminal 2 to the rest of the plurality of game terminals. In other words, the present invention is applicable to a so-called conference-style chat. Even according to this embodiment, as in Embodiments 1 and 2, the user who has received the message can secure a chance to reply to a received message, thereby preventing a chat from ending with the conversation unfinished.

In Embodiments 1 and 2 the game terminals 2 and the game server 1 are used as devices that constitute a chat system. Alternatively, general communication devices such as personal computers and personal digital assistants may be used instead of the game terminals 2, and a known general server computer may be used instead of the game server 1. With this configuration, the chat may be performed in different situations from online gaming. In other words, the present invention can be applicable to a general chat that is performed with personal computers as the chat devices and a server computer as the chat server.

While a server device such as the game server 1 herein relays messages between client devices such as the game terminals 2, the present invention may be applied to an embodiment in which the respective client devices form a so-called peer-to-peer network to perform direct communication with each another. This is realized by causing each of the client devices itself to hold the keyword data 12c and execute the chat function stop restricting processing in a similar manner as the game terminal 2 of Embodiment 2.

The basic restricting time of the stop restricting time is not limited to one that is determined in accordance with the character count of the message. For example, a time corresponding to a time required for inputting a message may be set as the stop restricting time.

Further, the end timing of the stop restricting time does not always need to be the stop restricting time end time that is calculated based on the stop restricting time. For example, if the stop restricting time end time arrives while a user to which a message has been transferred is inputting a reply message, the stop restricting time end time may be prolonged until the time the reply message is transmitted. According to this configuration, it is possible to prevent the chat function from being stopped by the chat stop operation of the partner user while the user is inputting a reply message.

Further, in Embodiment 1, in the case where the stop of the chat function is restricted on the message sender game terminal 2, when the game sever 1 receives a reply message from the message recipient game terminal 2, the timing is used for ending the restriction of the stop of the chat function on the message sender game terminal 2. Further, similarly to Embodiment 2, in the case where the stop of the chat function is restricted on the message sender game terminal 2, the restriction of the stop of the chat function on the message sender game terminal 2 may be ended at a timing at which the game terminal 2 receives the reply message from the message recipient game terminal 2.

The invention claimed is:

1. A chat system including a plurality of chat devices each including:
   a message input means through which a user inputs a message;
   a message transmission means which transmits a message input through the message input means;
   a message reception means which receives a message;
   a message output means which outputs a message received by the message reception means; and
   a message reception/output stop means which stops the message reception and output by the message reception means and the message output means in response to a given operation by the user,
   the chat system comprising:
   a stop restriction means which restricts the message reception/output stop means from stopping the message reception and output;
   a keyword storage means which stores a keyword or keywords;
   a keyword presence/absence judgment means which, when one of the chat devices transmits a message through the message transmission means, judges whether or not any keyword stored in the keyword storage means is found in the message;
   a keyword finding means for finding the keyword stored in a table from the message, said table correlating a chat stop restricting time with a keyword type; and
   a determination means for determining the chat stop restricting time of the restriction based on the keyword found by the keyword finding means and the table that correlates the chat stop restricting time with the keyword type,
   wherein the stop restriction means restricts the reception and output of messages from being stopped in the one of the chat devices for a duration of the given chat stop restricting, wherein each of said chat devices comprises a processor.

2. A chat system as claimed in claim 1, further comprising a timer means which measures the given chat stop restricting time.

3. A chat system as claimed in claim 1, wherein the keyword storage means, the keyword presence/absence judgment means, and the stop restriction means are provided in each of the chat devices.

4. A chat system as claimed in claim 1, further comprising a chat server which receives a message transferred from one of the chat devices and transfers the message to another chat device,
   wherein the keyword storage means, the keyword presence/absence judgment means, and the stop restriction means are provided in the chat server.

5. A chat system as claimed in claim 4,
   wherein each of the chat devices further includes:
   a keyword input means through which a user inputs a keyword; and
   a keyword transmission means which transmits a keyword input through the keyword input means to the chat server, and wherein
   the keyword storage means receives and stores a keyword transmitted by the keyword transmission means.

6. A chat system as claimed in claim 4, wherein the chat devices are video game terminals, and the chat server is a video game server.

7. A method of controlling chat devices for use in a chat system, comprising the steps of:
   inputting a message;
   transmitting the input message;
   receiving the message;
   outputting the received message;
   stopping the message reception and output in response to a given operation by a user;
   reading stored data out of a keyword storage means, which stores a keyword or keywords;
   judging whether or not any read keyword is found in a message to be transmitted;
   finding the keyword stored in a table from the message, said table correlating a chat stop restricting time with a keyword type;
   determining the chat stop restricting time of the restriction based on the keyword found by the finding and the table that correlates the chat stop restricting time with the keyword type; and
   restricting the message reception and output from being stopped for a duration of the given chat stop restricting time.

8. A method of controlling a chat server for use in a chat system including a plurality of chat devices, comprising the steps of:
   receiving a message from each of the chat devices;
   transferring the received message to another of the plurality of chat devices;
   reading stored data out of a keyword storage means, which stores a keyword or keywords;
   judging whether or not any read keyword is found in the message transferred from each chat device;
   finding the keyword stored in a table from the message, said table correlating a chat stop restricting time with a keyword type;
   determining the chat stop restricting time of the restriction based on the keyword found by the keyword finding means and the table that correlates the chat stop restricting time with the keyword type; and
   restricting the message reception and output from being stopped for a duration of the given chat stop restricting time.

9. A non-transitory computer-readable information storage medium storing a program which causes a computer to function as:
- a message input means through which a message is input;
- a message transmission means which transmits the input message;
- a message reception means which receives a message;
- a message output means which outputs the received message;
- a keyword storage means which stores a keyword or keywords;
- a message reception/output stop means which stops the message reception and output in response to a given operation by a user;
- a keyword presence/absence judgment means which judges whether or not any keyword stored in the keyword storage means is found in a message transmitted by the message transmission means;
- a keyword finding means for finding the keyword stored in a table from the message, said table correlating a chat stop restricting time with a keyword type; a determination means for determining the chat stop restricting time of the restriction based on the keyword found by the keyword finding means and the table that correlates the chat stop restricting time with the keyword type; and
- a stop restriction means which restricts the message reception and output from being stopped for a duration of the given chat stop restricting time.

10. A non-transitory computer-readable information storage medium storing a program which causes a computer, for use in a chat system including a plurality of computers, to function as:
- message reception means which receives a message transferred from each of the computers;
- message transferring means which transfers the received message to another of the plurality of computers;
- keyword storage means which stores a keyword or keywords;
- keyword presence/absence judgment means which judges whether or not any keyword stored in the keyword storage means is found in a message transmitted by a message transmission means of each of the computers;
- a keyword finding means for finding the keyword stored in a table from the message, said table correlating a chat stop restricting time with a keyword type;
- a determination means for determining the chat stop restricting time of the restriction based on the keyword found by the keyword finding means and the table that correlates the chat stop restricting time with the keyword type; and
- stop restriction means which restricts the message reception and output from being stopped in the computer for a duration of the given chat stop restricting time.

11. A chat system as claimed in claim 2, wherein the keyword storage means, the keyword presence/absence judgment means, and the stop restriction means are provided in each of that devices.

12. A chat system as claimed in claim 5, wherein the chat devices are video game terminals, and the chat server is a video game server.

13. A chat system including a plurality of chat devices each comprising:
- a message input field that accepts a user input;
- a message output field that outputs a message based on the user input; and
- a button that stops output of the received message by the message output field in response to a given operation by the user,
- the chat system comprising a control unit having a processor, said control unit comprising:
- a keyword presence/absence judgment unit that, when one of the chat devices transmits a message, judges whether a stored keyword is found in the message, and determines a duration of a given chat stop restricting time;
- a keyword finding unit that finds the keyword stored in a table from the message, said table correlating a chat stop restricting time with a keyword type;
- a determination means that determines the chat stop restricting time of the restriction based on the keyword found by the keyword finding unit and the table that correlates the chat stop restricting time with the keyword type; and
- a stop restriction unit that which restricts the user from using the button to stop output of the received message for the duration of the given chat stop restricting time.

14. The chat system of claim 13, further comprising a timer that measures the given chat stop restricting time.

15. The chat system of claim 13, wherein the keyword presence/absence judgment unit and the stop restriction unit are provided in each of the chat devices.

16. The chat system claim 13, further comprising a chat server which receives a message transferred from one of the chat devices and transfers the message to another chat device, wherein the keyword presence/absence judgment unit and the stop restriction unit are provided in the chat server.

17. The chat system of claim 16, each of the chat devices further comprising:
- a keyword input field through which a user inputs a keyword that is transmitted to and stored in the chat server.

18. The chat system of claim 16, wherein the chat devices are video game terminals, and the chat server is a video game server.

* * * * *